C. DE LEON.
TOBACCO HARVESTER.
APPLICATION FILED FEB. 17, 1912.
1,055,023.
Patented Mar. 4, 1913.
2 SHEETS—SHEET 2.
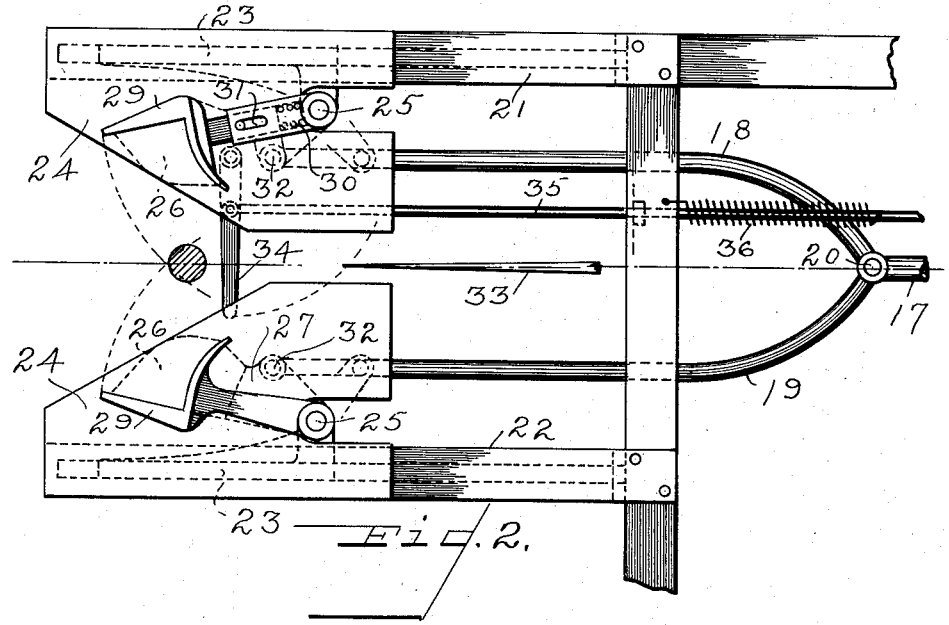
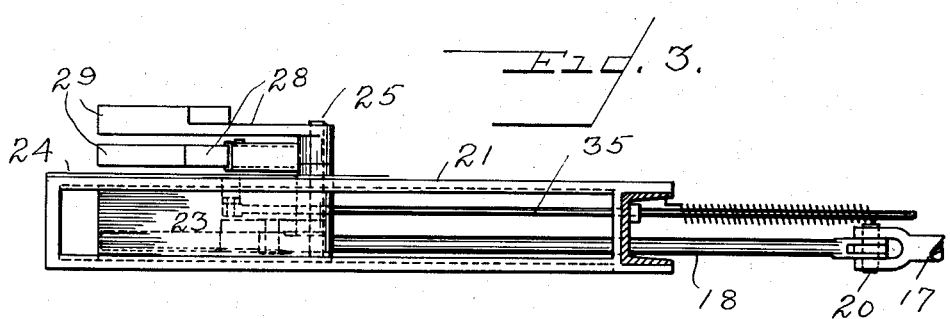
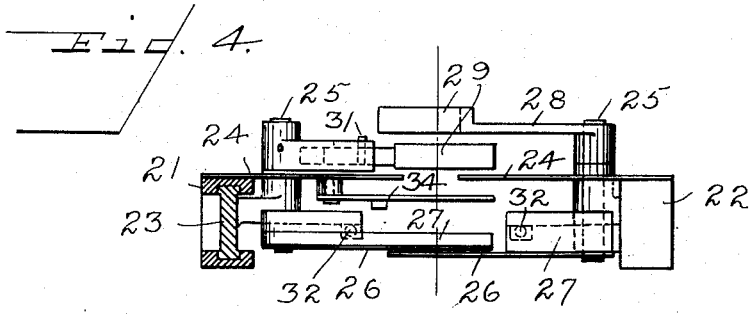

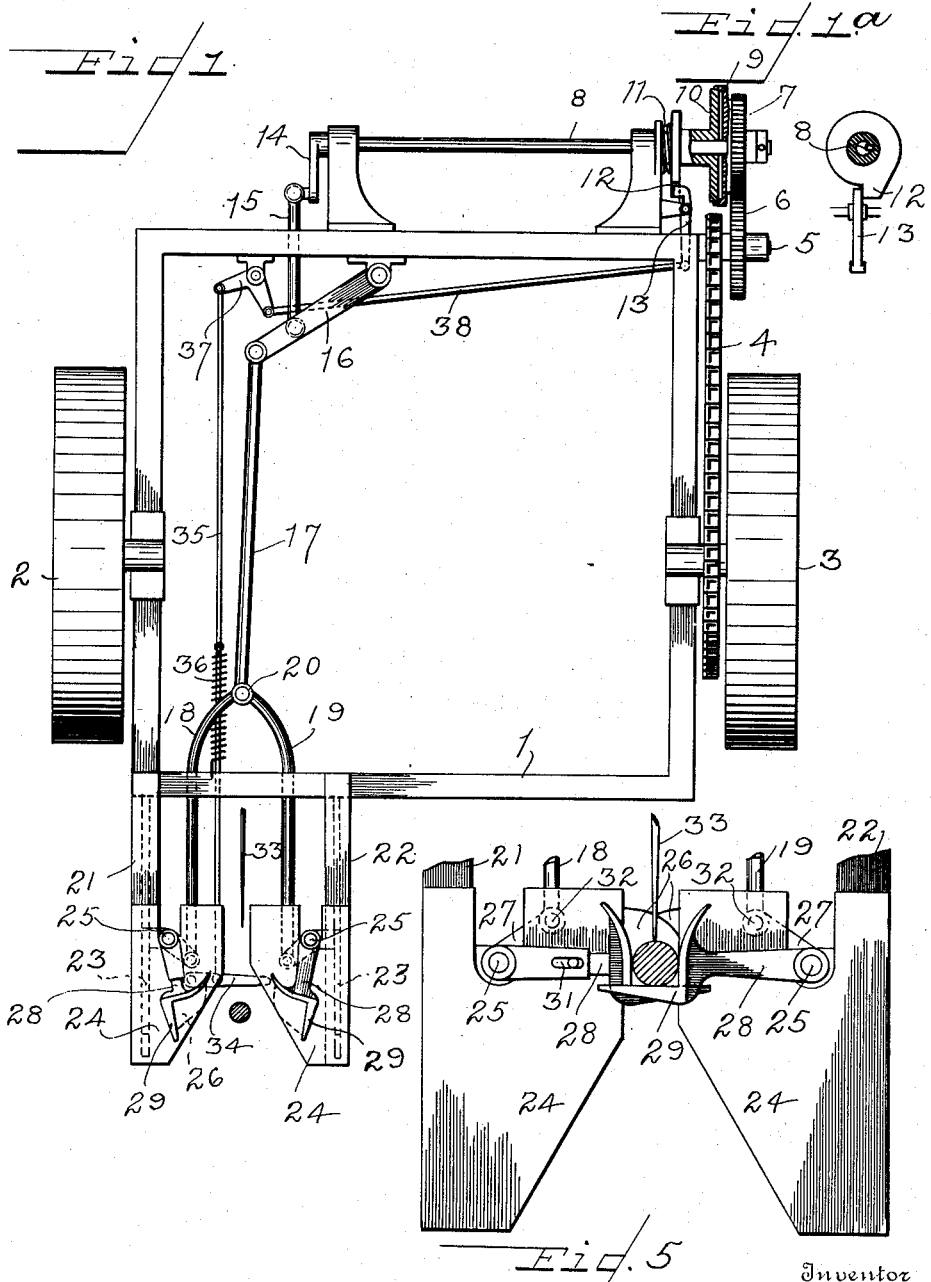

UNITED STATES PATENT OFFICE.

CARLOS DE LEON, OF DAYTON, OHIO, ASSIGNOR TO ROBERT N. KING, OF DAYTON, OHIO.

TOBACCO-HARVESTER.

1,055,023.  Specification of Letters Patent.  Patented Mar. 4, 1913.

Application filed February 17, 1912. Serial No. 678,270.

*To all whom it may concern:*

Be it known that I, CARLOS DE LEON, a citizen of the United States, residing at Dayton, in the county of Montgomery and State of Ohio, have invented certain new and useful Improvements in Tobacco-Harvesters, of which the following is a specification.

My invention relates to improvements in harvesting machines and particularly to tobacco harvesters adapted to automatically sever the growing stalk and to spear or spud the stalk by impaling it upon a suitable impaling needle.

It is the custom to suspend harvested tobacco plants from a suitable support or lath during the initial curing operation. The usual method of securing the plants upon the lath or support is to thrust such lath or support through the plant or in other words by impaling the plant thereon. This operation as performed by hand is both tedious and costly and frequently results in serious injury to the leaves of the plant.

The object of the present invention is to simplify the structure as well as the means and mode of operation of tobacco harvesting machines, whereby they will not only be cheapened in construction, but will be more efficient in use, positive in operation, automatic in their action and unlikely to get out of repair.

A further object of the invention is to provide improved means for severing the woody stalk of the plant and for centering the stalk in relation to the impaling needle and by further movement of the mechanism to perform the initial impaling operation.

With the above primary and other incidental objects in view as will more fully appear in the specification, the invention consists of the features of construction, the parts and combinations thereof and the mode of operation, or their equivalents, as hereinafter described and set forth in the claims.

The invention forming the subject matter hereof relates primarily to the cutting or severing and the initial impaling mechanism of a tobacco harvester which may be employed with stalk conveying mechanism or support feeding and discharging mechanism such as is shown in the copending application of Frederick H. Cook, or the copending application of Robert N. King, or any other suitable stalk conveying and support feeding and discharge mechanism, therefore such mechanism has not been deemed necessary to be shown and described in this application.

In the drawings, Figure 1 is a plan view of the main frame of a harvester showing the severing and impaling devices and the driving mechanism. Fig. 1ª is a detail view of the non-repeat clutch. Fig. 2 is a detail plan view of the severing and impaling devices in their normal or set position. Fig. 3 is a side elevation and Fig. 4 is an end elevation of the mechanism shown in Fig. 2. Fig. 5 is a detail plan view of the severing and impaling devices in their operated position.

Like parts are indicated by similar characters of reference throughout the several views.

In constructing the machine there is employed a main frame 1 supported on carrying wheels 2 and 3. The carrying wheel 3 also serves as a drive wheel for the several moving parts. The wheel 3 carries with it a sprocket engaged by a sprocket chain or belt 4 also engaging a driven sprocket or a stud 5 carried on the main frame. There is mounted on the stud 5 a gear pinion 6 rotating in unison with the driven sprocket. The said gear pinion meshes with a corresponding gear 7 loosely journaled on the transverse drive shaft 8. The gear pinion 7 carries with it one member 9 of a friction clutch, the other member 10 of which is engaged with the shaft 8 by means of a suitable key or feather whereby said member 10 may be permitted a limited longitudinal movement upon the shaft while compelled to rotate in unison therewith. The friction member 10 is thrust into engagement with the member 9 by a spring 11. The member 10 is provided with a flanged hub from the flange of which projects a lug 12 engaged by a pivoted detent 13 to prevent the rotation of the member 10 and the shaft 8. When the detent 13 is engaged with the lug 12 the member 10 will slide within the member 9, the member 10 yielding slightly against the tension of the spring 11. However when the detent 13 is withdrawn from engagement with the lug 12 the friction members 9 and 10 will be engaged one with the other, causing the shaft 8 to be rotated in unison with the gear member 7. The detent 13 is withdrawn at the proper time in the sequence of operations by means hereinafter described. At its extremity the shaft 8 carries a crank 14 connected by a pitman 15 with an oscillating lever 16 pivoted to the main frame 1. The connection of the pitman 15 with the crank 14 and the lever 16 are preferably by ball and socket or universal joints. The oscillating lever 16 is connected to a reciprocating bifurcated link 17 the arms 18 and 19 of which are preferably pivoted to the link 17 at the point 20. The cutting and impaling mechanisms are carried forward of the main frame 1 and are supported on two parallel recessed frames 21 and 22. The recessed frames or arms 21 and 22 are each provided with suitable ways or guides in which are located reciprocating heads 23. Projecting inward from the arms or frames 21 and 22 are shields or guides 24 which support the lowermost leaves of the plants and prevent their being engaged by the severing devices located below such shields.

Journaled in suitable brackets projecting from the inner side of the sliding head 23 are vertical shafts 25 carrying below the guide 24 oscillating shear blades 26. These oscillating shear blades are carried by suitable supporting arms 27 rigidly secured upon the rock shaft 25 and the blades are so located in relation to each other that when in their operated position they will overlap as clearly shown in Figs. 4 and 5.

At their upper end and above the shields or guides 24 the rock shaft 25 carries oscillating stalk supporting and impaling arms 28 each terminating in an L shaped stalk engaging head 29. Either one or both of the oscillating arms 28 may be made to telescope against the tension of a spring 30 as shown in Fig. 2. In the drawing one of the arms 28 has been shown as formed in two sections one of which reciprocates within or telescopes within the other, the limit of movement being determined by a slot and pin connection 31. The spring 30 tends to hold the movable portion of the arm in its outermost or extended position. By this means the stalk engaging and impaling arms are made to yield to accommodate stalks of different diameter. The arms 18 and 19 of the reciprocating member 17 are connected preferably to the shear blade supporting arms 27 as at 32. However it is obvious that the arms 18 and 19 might be connected to a suitable rock arm carried by the rock shaft 25 independent of the supporting and impaling arms 28. The connection point 32 is located inward beyond the line of the shaft 25 whereby the initial movement of the member 17 and its arms 18 and 19 will tend to oscillate the shaft 25 and the arms 27 and 28 carried thereby causing the shear blade 26 to engage and sever the standing stalk to be harvested as said blades approach each other while at the same time the L shaped heads 29 of the oscillating arms 28 will engage the severed stalk on opposite sides securely gripping the stalk and centering it in relation to the impaling needle 33 carried upon the main frame 1.

The actuating mechanism is set in motion to cause such movement of the parts by the engagement of a trip lever 34 with the standing stalk to be harvested as the machine advances toward said stalk. As the trip lever 34 engages the stalk the said lever is oscillated thereby reciprocating a link 35 connected to the lever 34 against the tension of a retracting spring 36. The link 35 is connected at its rear end to a bell lever 37 the opposite arm of which is connected by a link 38 with one end of the pivoted detent 13. The oscillation of the trip lever 34 acts through the link 35, the bell lever 37 and the link 38 to withdraw the detent 13 from its engagement with the lug 12 thereby permitting the drive shaft 8 to rotate. The rotation of the drive shaft 8 acts through the crank 14 and the pitman 15 to oscillate the lever 16 which being connected directly with the reciprocating member 17 operates said member 17 and its arms 18 and 19 throughout a reciprocating movement. The initial reciprocating movement of the members, 17, 18 and 19 serves to rock the shaft 25 and the arms 27 and 28 carried thereby to cause the stalk to be severed and to be engaged by the stalk engaging heads 29. A further movement of said parts serves to reciprocate the sliding heads 23 in unison within the guides or ways of the arms or frames 21 and 22. The growing stalk after having been severed by the shear blades 26 rests on said blade and is firmly gripped by the L shaped heads 29 located above the guide or shield 24 and in this position is carried rearward as the sliding heads 23 are reciprocated. As the severed stalk is carried rearward by the reciprocation of the sliding heads 23 it engages the sharpened extremities of the impaling needle 3 in relation with which it has been centered by the action of the operating arms 28. As the sliding heads 23 continue to move rearward the severed stalk is forcibly thrust upon the sharpened extremity of the needle 33 causing it to be impaled thereby. The crank 14 of the main shaft 8 after having completed a half revolution begins to move the reciprocating member 17 forward, the initial forward movement of this member oscillates the rock shaft 25 to carry the supporting arms 28 and the cutting blades 26 to their normal positions. A further movement of the member 17 due to the continued rotation of the crank 14 will reciprocate the sliding heads 23 to their forward position preparatory to the next operation.

It is to be understood that the particular friction clutch 9 and 10 and the clutch arresting means 13 as shown and described are not essential but that any desired form of nonrepeat clutch may be substituted therefor. Likewise the particular clutch operating connection between the trip lever 34 and said clutch may be modified. Furthermore any other suitable connection between the reciprocating member 17 and the drive shaft 8 may be made whereby said member 17 will be reciprocated by the rotation of the shaft thereby eliminating the crank 14, the pitman 15 and the oscillating lever 16.

From the above description it will be apparent that there is thus provided a harvester of the character described possessing the particular features of advantage before enumerated as desirable but which obviously is susceptible of modification in its form, proportion, detail construction and arrangement of parts and without departing from the principle involved or sacrificing any of its advantages.

While in order to comply with the statute the invention has been herein described in language more or less specific as to certain structural features, it is to be understood that the invention is not limited to any specific details, but that the means and mechanism herein shown and described comprise but one mode of putting the invention into effect and that the invention is therefore claimed broadly in any of its possible forms or modifications within the scope of the appended claims.

Having thus described my invention, I claim;

1. In a tobacco spearing machine, a main frame, stalk severing means carried thereon, an impaling needle carried upon the frame and extending in alinement with the standing stalk to be harvested, a stalk engaging member pivoted out of alinement with the stalk to be harvested and movable about its pivotal connection into position to engage said standing stalk, and actuating means for said engaging member adapted by its initial movement to move said engaging member through an arcuate path into engagement with the stalk and by further movement to subsequently reciprocate the engaging member to impale the stalk upon the needle, substantially as specified.

2. In a tobacco spearing machine, a main frame, a pair of reciprocatory supports, oscillatory stalk engaging means carried by said supports, means to oscillate said engaging means into engagement with the stalk and subsequently to reciprocate the stalk engaging means and the stalk engaged thereby and an impaling needle extending into the path of the stalk, substantially as specified.

3. In a tobacco spearing machine, a main frame, an impaling needle, a pair of independently pivoted stalk engaging arms, and means for oscillating said arms in unison into engagement with the stalk whereby the said arms will center the stalk in relation to the impaling needle, substantially as specified.

4. In a harvesting machine, a main frame, a pair of oscillating shear blades, actuating means therefor adapted by its initial movement to oscillate the shear blades and by further movement to shift said blades through a reciprocatory path while maintaining the blades in their oscillated position, substantially as specified.

5. In a tobacco spearing machine, a main frame, a pair of stalk engaging members movable to and from each other, actuating mechanism therefor adapted to cause said stalk engaging members to initially approach each other and subsequently to move said members in unison through a reciprocatory path, substantially as specified.

6. In a tobacco spearing machine, a main frame, a pair of reciprocating heads, stalk engaging means carried by the heads, actuating means adapted to cause the engagement of the stalk by the said stalk engaging means and to subsequently reciprocate said heads, substantially as specified.

7. In a harvesting machine, a main frame, a pair of reciprocatory supports, oscillatory members carried by the supports, shear blades carried by the oscillatory members adapted to sever the stalks to be harvested, stalk engaging means also carried by said oscillatory members adapted to support the severed stalk, means to oscillate said oscillatory members and to subsequently reciprocate the reciprocatory supports, substantially as specified.

8. In a tobacco spearing machine, a main frame, a pair of independently pivoted shear blades, a stalk spearing needle, said blades normally occupying positions out of alinement with the stalk spearing needle and on opposite sides of a line projected through said needle and parallel with the path of travel, and means for simultaneously oscillating said blades to positions intersecting such projected line, substantially as specified.

In testimony whereof, I have hereunto set my hand this 7th day of February 1912.

CARLOS de LEON.

Witnesses:
 HARRY F. NOLAN,
 F. L. WALKER.